(12) United States Patent
Laurichesse et al.

(10) Patent No.: US 9,519,064 B2
(45) Date of Patent: Dec. 13, 2016

(54) GEOPOSITIONING METHOD USING ASSISTANCE DATA

(75) Inventors: Denis Laurichesse, Tournefueille (FR); Flavien Mercier, Auzeville (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 1092 days.

(21) Appl. No.: 13/256,260

(22) PCT Filed: Mar. 11, 2010

(86) PCT No.: PCT/EP2010/053129
§ 371 (c)(1),
(2), (4) Date: Sep. 13, 2011

(87) PCT Pub. No.: WO2010/103082
PCT Pub. Date: Sep. 16, 2010

(65) Prior Publication Data
US 2012/0001799 A1  Jan. 5, 2012

(30) Foreign Application Priority Data

Mar. 13, 2009 (FR) ..................... 09 51611

(51) Int. Cl.
*G01S 19/44* (2010.01)
*G01S 19/04* (2010.01)
*G01S 19/43* (2010.01)

(52) U.S. Cl.
CPC ............... *G01S 19/44* (2013.01); *G01S 19/04* (2013.01); *G01S 19/43* (2013.01)

(58) Field of Classification Search
CPC ........... G01S 19/04–19/05; G01S 19/43–19/44
(Continued)

(56) References Cited

U.S. PATENT DOCUMENTS

2009/0024325 A1\* 1/2009 Scherzinger .................. 702/5
2009/0135057 A1\* 5/2009 Vollath et al. ........... 342/357.03
(Continued)

FOREIGN PATENT DOCUMENTS

FR    2914430 A1    10/2008
WO   WO 98/02762 A2 \*  1/1998

OTHER PUBLICATIONS

H. Rho et al., Dual-Frequency GPS Precise Point Positioning with WADGPS Corrections, Navigation, Journal of the Institute of Navigation, vol. 54(2), p. 139-152, 2007.\*
(Continued)

*Primary Examiner* — Tashiana Adams
*Assistant Examiner* — Fred H Mull
(74) *Attorney, Agent, or Firm* — Cantor Colburn LLP

(57) ABSTRACT

In order to enable a geopositioning receiver of a user to resolve phase ambiguities without necessarily using multi-frequency observations, assistance data is developed thanks to measurements made at a reference network (10, 12, 14) and sent to the receiver of the user. The assistance data used preferably consist of transmitter clock values associated with the carrier code sliding combination ($\Theta_{eme}$) or with data sufficient for reconstructing said values. The transmitter clock values associated with the carrier code sliding combination ($\Theta_{eme}$) can be reconstructed from iono-free transmitter clock values ($h_{eme}$) and clock biases ($C'_{eme}$), for example.

17 Claims, 3 Drawing Sheets

(58) Field of Classification Search
USPC ............ 342/357.26, 357.27, 357.41, 357.42
See application file for complete search history.

(56) References Cited

U.S. PATENT DOCUMENTS

| | | | |
|---|---|---|---|
| 2009/0143018 A1* | 6/2009 | Anderson | G01S 5/021 455/67.11 |
| 2011/0050492 A1* | 3/2011 | Um | G01S 19/07 342/357.27 |
| 2011/0064312 A1* | 3/2011 | Janky et al. | 382/195 |

OTHER PUBLICATIONS

Accuracy. (2001). In F. Hargrave, Hargrave's communications dictionary, wiley. Hoboken, NJ: Wiley. Retrieved from http://search.credoreference.com/content/entry/hargravecomms/accuracy/0.*

Precision. (2001). In F. Hargrave, Hargrave's communications dictionary, wiley. Hoboken, NJ: Wiley. Retrieved from http://search.credoreference.com/content/entry/hargravecomms/precision/0.*

E. Danson, More GPS high-accuracy choice for civil engineers, Proceedings of the Institution of Civil Engineers, vol. 162(1), p. 10, Feb. 2009.*

B. Hofmann-Wellenhof et al., Global Positioning System: Theory and Practice, Springer-Verlag/Wein, p. 133-180, 2001.*

International Search Report PCT/EP2010/053129; Dated Jul. 7, 2010.

P. Heroux, Products and Applications for Precise Point Positioning—Moving Towards Real-Time, Proceedings of Ion GNSS 2004, Sep. 21, 2004, pp. 1832-1843, XP002561473.

Kongzhe Chen, "Real-Time Precise Point Positioning Using Single Frequency Data", Proceedings of Ion GNSS 2005, Sep. 13, 2005, pp. 1514-1523, XP002561472.

D. Laurichesse, "Real Time Zero-Difference Ambiguities Fixing and Absolute RTK", Proc. of the 2008., National Technical Meeting of Ion, San Diego, Jan. 28, 2008, pp. 747-754, XP002532442.

* cited by examiner

GEOPOSITIONING METHOD USING ASSISTANCE DATA

TECHNICAL FIELD

The present invention concerns the field of radio-navigation or positioning by satellite, in particular a method of geopositioning that uses assistance data calculated using a network of reference receivers. The invention further concerns a method for calculating the required assistance data. The scope of the invention is notably the reception of radio-navigation signals emitted by the transmitters of a satellite positioning system, for example. GPS ("Global Positioning System), Galileo, Glonass, QZSS, Compass, IRNSS, etc.

BACKGROUND

In general, the radio-navigation signals transmitted by satellites (or pseudolites) in a positioning system have the form of a carrier modulated by a spreading waveform containing a pseudo-random binary code. The modulation of the carrier causing the spread of the spectrum around the carrier frequency, the radio-navigation signals are often called "spread spectrum" signals. The pseudo-random codes represent an identifier of the signal and, therefore, of the satellite transmitter. Known by the receivers, they allow these a Code-Division Multiple Access (CDMA). Subsidiarily, some satellite positioning signals can also carry useful data (e.g. the navigation message) as a binary sequence (at much lower rate than the pseudo-random code) additionally modulated on the carrier.

In the case of GPS, the radio-navigation signals are transmitted in the frequency bands L1, centred on 1575.42 MHz, and L2, centred on 1227.6 MHz. As part of the modernisation of GPS, the L5 band, centred on 1176.45 MHz, will be added. The Galileo constellation satellites will transmit in the bands E2-L1-E1 (the portion of the median L1 band is the same as that of GPS), E5a (which, according to the Galileo nomenclature, represents the L5 band scheduled for GPS), E5b (centred on 1207.14 MHz) and E6 (centred on 1278.75 MHz). Note that satellites of the Compass constellation transmit or will transmit in the band B1 (centred on 1561.098 MHz), B1-2 (centred on 1589.742 MHz), L1 (centred on 1575.42 MHz), B2 (centred on 1207.14 MHz) and B3 (centred on 1268.52 MHz). The centre frequencies are the carrier frequencies of the various signals.

The reception of a radio-navigation signal typically includes a first demodulation using an internal replica of the carrier generated in the receiver by an oscillator driven by a carrier tracking loop and a second demodulation using an internal replica of the spreading waveform produced by a waveform generator controlled by a spreading waveform tracking loop (also called "code tracking loop"). The control signals of the carrier tracking loop and the spreading waveform are used by the receiver to determine its position. The signal of the phase difference between the signal carrier received and the internal carrier replica produced at each time step by the carrier tracking loop provides a first observable (the phase observable or measurement). The signal delay between the spreading waveform of the received signal and the replica internal spreading waveform produced at each time step by the tracking loop spreading waveform is a second observable (the code observable or measurement).

The elementary measurements that a receiver can make thus include code measurements and carrier phase measurements. These elementary measurements can obviously be combined. The code measurements are accurate to the order of the meter whereas the phase measurements are accurate to a few mm. However, the phase measurements have the disadvantage that they deliver only the real part of the difference in carrier phase between the emission by the satellite and the receiver. The phase measurements are therefore ambiguous in the sense that the number of integer cycles between the transmitter (the satellite) and the receiver is unknown at the start. In order to be able to benefit from the accuracy of the phase measurements, a receiver must resolve the ambiguities by which they are vitiated.

The resolution of the phase ambiguities is commonly done by differentiation of the phase measurements (single or double differentiation). This differentiation enables (not modelled) error sources common to several measurements to be eliminated, and thereby allows an integer information to be revealed, which, when taken into account, further improves performance. However, this integer information consists of the differences between one or more elementary phase ambiguities and does not generally enable one to work back to the elementary phase ambiguities.

Patent application FR 2 914 430 describes a method that solves, in a consistent manner, the phase ambiguities on a network of reference receivers with the aid of dual frequency observations (i.e. code and phase measurements on at least two distinct frequencies). At the same time, this method produces a set of satellite clocks that can be used as assistance data by a dual-frequency receiver external to the network (e.g. that of a user who wishes to know his position). These clocks have the particular property of highlighting entire phase ambiguities when one solves the positioning equations obtained by "elementary" measurements, i.e. neither differentiated between satellites nor between receivers. The disadvantage of the method of the application FR 2 914 430 is that it can only be applied by dual-frequency receivers.

BRIEF SUMMARY OF THE INVENTION

The invention provides a method for geopositioning that allows a receiver to remove its phase ambiguities without necessarily resorting to multi-frequency observations. The invention further provides a method for determining the assistance data required for such a geopositioning method.

In general, the invention comprises two aspects. First, it comprises a method that takes place at the level of a network of reference receivers (stations) in which is determined additional information (assistance data), with the help of which a user receiver that is not part of the network can resolve the phase ambiguities. Furthermore, the invention comprises the method that is executed at the level of a receiver that does not necessarily form part of the network and that uses the additional information worked out using the network of reference stations and made available by any means of communication.

For reasons of clarity, the method of determining assistance data is treated first. In the following, we will assume that the radio-navigation signals come from a set of radio-navigational satellites, each broadcasting at least a first radio-navigation signal on a first frequency and a second radio-navigation signal on a second frequency distinct from the first.

The method of determining assistance data comprises the actions:

receiving (elementary, i.e. neither differentiated between receivers nor between satellites) code measurements and phase measurements from radio-navigation signals recorded by receivers in a reference network; said phase measurements each having an ambiguity that is, a priori, an unknown integer number of cycles;

resolving the ambiguities in the phase measurements on the first frequency in a consistent manner for all the satellites and reference receivers;

deducing a set of iono-free transmitter phase clock values arising from the consistent resolution of said ambiguities and a coherent set of iono-free phase receiver clock values arising from the consistent resolution of said ambiguities;

calculating, for each satellite-reference receiver pair, a carrier code shift combination value from the code measurement and the phase measurement performed by this reference receiver and for this satellite on the first frequency, and subtracting from this value the geometric contribution, the contribution of the values of the iono-free receiver phase clock and of the iono-free transmitter phase clock as well as the contribution of the resolved ambiguity of the phase measurement, so as to obtain a measurement residue;

separating, in a manner consistent for all the satellites and receivers of the network, each of the obtained measurement residues into a transmitter part and a receiver part, and smoothing the transmitter part of the said measurement residues.

Preferably, the iono-free transmitter clock values associated with the consistent resolution of the ambiguities as well as the smoothed transmitter parts of the said measurement residues are provided to receivers outside the network as assistance data.

According to a preferred mode of operation of the invention, the method comprises, for each satellite of the set of satellites, the action of calculating a transmitter clock value associated with the carrier code shift combination as the sum of the iono-free transmitter clock value and the smoothed measurement residue.

Preferably, the transmitter clock values associated with the carrier code shift combination are made available to receivers outside the network as assistance data, for example by a means of telecommunication, such as the Internet, terrestrial broadcasting or by satellite, etc.

The smoothing of the transmitter parts of the said measurement residues can be made each time by fitting a sine function of a period of 12 hours on the transmitter part to be smoothed. This can be done notably by means of a least squares method.

Advantageously, the method for determining assistance data is implemented in a computer program product comprising carrier means (computer memory, hard disk, optical or radio waves, etc.) containing a computer program code configured to implement the method when the program is run on a computer.

In regard to the first aspect of the invention, a method for geopositioning comprises, at the level of a radio-navigation signal receiver, the actions of:

receiving, for each satellite of the said set and visible from the said receiver, at least the said first radio-navigation signal;

performing, for each visible satellite, the (elementary, that is, neither differentiated between the receivers nor between the satellites) code measurements and phase measurements of the first radio-navigation signal received, said phase measurements presenting an ambiguity of an a priori unknown integer number of cycles;

receiving a set of assistance data, this comprising, for each satellite of the set of satellites, sufficient data to reconstruct the transmitter clock value associated with the carrier code shift combination, derived in a consistent manner for all the satellites and receivers in a reference network;

calculating, for each satellite, a carrier code shift combination value from the code measurement and the phase measurement of the first navigation signal, and subtracting from this carrier code shift combination value the transmitter clock value associated with the carrier code shift combination, so as to obtain an unambiguous carrier code shift observable; and determining the position of the receiver using the non-ambiguous carrier code shift observables.

The data sufficient to reconstruct the transmitter clock value associated with the carrier code shift combination preferably comprise the satellite clock value associated with the carrier code shift combination itself. Alternatively, the data sufficient to reconstruct the transmitter clock value associated with the carrier code shift combination value can comprise the iono-free transmitter phase clock values associated with the consistent resolution of the ambiguities as well as the smoothed transmitter parts of the measurement residues obtained by a method as described above.

The methods according to the invention are considered particularly advantageous for the L5 frequency band (the first frequency in this case being 1176.45 MHz). Alternatively, the first frequency could be 1575.42 MHz, 1227.6 MHz, 1207.14 MHz 1278.75 MHz 1561.098 MHz 1589.742 MHz 1207.14 MHz or 1268.52 MHz.

Advantageously, the geopositioning method is implemented in a computer program product comprising carrier means (computer memory, hard disk, optical or radio waves, etc.) containing a computer program code configured to implement the method.

Preferably, the geopositioning method is implemented in a satellite geopositioning device, commonly known as a GNSS ("Global Navigation Satellite System") receiver.

The geopositioning process can be implemented as an a posteriori process or as a real-time process.

BRIEF DESCRIPTION OF THE DRAWINGS

Other characteristics and features of the invention will become apparent from the detailed description of a preferred method of implementation given below, for illustration, with reference to the accompanying drawings. These show.

DETAILED DESCRIPTION

Figure 1:
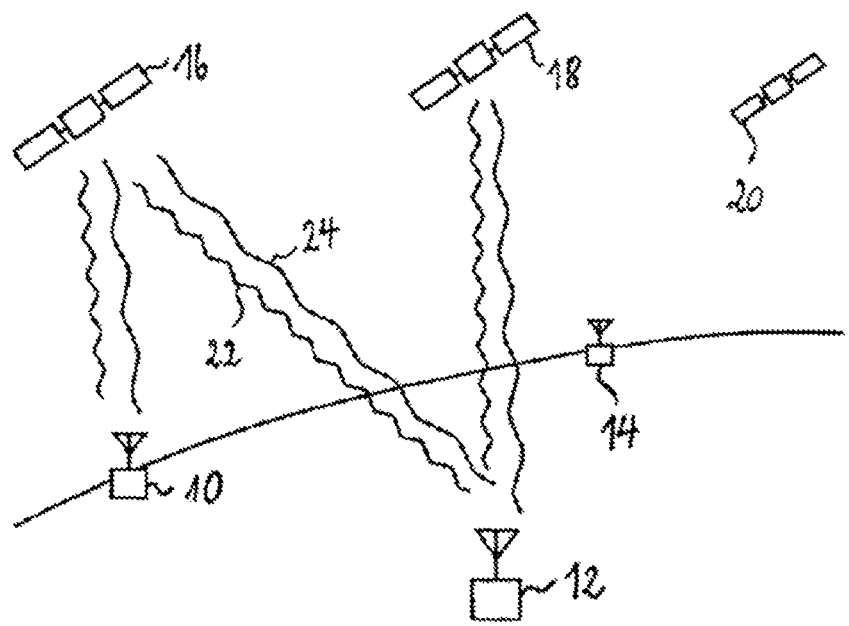
FIG. 1: a schematic illustration of a network of reference receivers.

A navigation signal receiver can perform (non-ambiguous) code measurements and phase measurements (ambiguous by an integer number of cycles) on the radio-navigation signals it receives from various visible satellites (i.e. satellites above the horizon). A multi-frequency receiver can perform these measurements on at least two distinct frequencies f1 and f2. Assuming a dual-frequency receiver, one therefore has, for each visible satellite and at each time step, two code measurements, denoted P1 and P2, and two phase measurements, denoted L1 and L2, on frequencies f1 and f2. At each time step (tk), one therefore obtains, in a receiver, a set of code and phase measurements P1j(tk), P2j(tk), L1j(tk) and L2j(tk), where the superscript (j) indicates the satellite, whose signal is received by the receiver. As the satellites orbit the Earth, only some of them are visible at a given time from the location of the receiver. For ease of notation, the dependence of time and the satellite index will not always be explicitly stated in the following.

We use the following notations:

$$\gamma = \frac{f_1^2}{f_2^2}, \lambda_1 = \frac{c}{f_1}, \lambda_c = \frac{c}{f_2}$$

where c is the speed of light. For the L1 and L2 bands of the GPS system, we have, for example: $f_1 = 154 f_0$ and $f_2 = 120 f_0$, where $f_0 = 10.23$ MHz. By convention, the code measurements $P_1$, $P_2$ are expressed in units of length, whereas the phase measurements $L_1$, $L_2$ are expressed in cycles.

The code measurements and phase measurements satisfy the following equations (measurements on the left, model parameters on the right):

$$P_1 = D_1 + e + \Delta H_{p,1}$$
$$P_2 = D_2 + \gamma e + \Delta H_{p,2}$$
$$\lambda_1 L_1 = D_1 + \lambda_1 W - e + \Delta H_1 - \lambda_1 N_1$$
$$\lambda_2 L_2 = D_2 + \lambda_2 W - \gamma e + \Delta H_2 - \lambda_2 N_2 \quad (E1)$$

where
- $D_1$ represents the propagation distance between the phase centres of the satellite and the receiver for the frequency $f_1$, including tropospheric elongation, relativistic effects, etc.
- $D_2$ is the analogous quantity for the frequency $f_2$;
- e is the ionospheric extension term which varies with the square of the frequency and comes with an opposite sign between the code measurement and the phase measurement;
- $N_1$ and $N_2$ represent the (integer) phase ambiguities of the two carriers,
- W represents the contribution of the "wind-up" effect, in cycles, and
- $\Delta H_{p,1}$, $\Delta H_{p,2}$, $\Delta H_1$, $\Delta H_2$ are the differences between the receiver clock and the transmitter clock for the different measurements.

Obviously, a single-frequency receiver can only make one code measurement and one phase measurement per satellite and per time step. Without loss of generality, we may assume that these measurements are $P_1$ and $L_1$ (instead of $P_2$ and $L_2$).

One calls "iono-free" code combination and denotes $P_c$ the combination of the code measurements that eliminates the ionospheric contribution:

$$P_c = \frac{\gamma P_1 - P_2}{\gamma - 1} = \frac{\gamma D_1 - D_2}{\gamma - 1} + \frac{\gamma \Delta H_{p,1} - \Delta H_{p,2}}{\gamma - 1} \quad (E2)$$

An (ambiguous) "iono-free" phase combination can be defined analogously. The advantage of working with "iono-free" combinations resides mainly in the fact that the ionosphere is a relatively unknown source of error in the sense that the ionospheric contribution is difficult to model with adequate accuracy. However, the "iono-free" code and phase combinations are only available in a receiver that is at a minimum dual-frequency.

In a single-frequency receiver, it is nevertheless possible to eliminate the ionospheric contribution by using measurements on the single frequency, thanks to the combination, denoted hereinafter as $P_e$, that is called "carrier code shift combination" (also called GRAPHIC combination, which is the acronym of the term "GRoup and PHase Ionospheric Correction") that uses the sum of the phase measurement and the code measurement. For the frequency $f_1$, this combination can be written as the arithmetic mean of the code measurement and the phase measurement:

$$P_e = \frac{P_1 - \lambda_1 L_1}{2} \quad (E3)$$

One therefore has:

$$P_e = D_1 + \frac{\lambda_1 W}{2} + \frac{\Delta H_{p,1} + \Delta H_1}{2} - \frac{\lambda_1 N_1}{2} \quad (E4)$$

The term $\Delta \Theta = (\Delta H_{p,1} + \Delta H_1)/2$ corresponds to the difference between a receiver clock associated with the carrier code shift combination (common to all channels of the receiver, denoted $\Theta_{rec}$) and a transmitter clock associated with the carrier code shift combination (which depends on the satellite, denoted $\Theta_{eme}$). This transmitter clock $\Theta_{eme}$ is a priori unknown for each satellite (for each channel of the receiver), which is why the combination of carrier code shift was previously of little practical interest in the case of non-differentiated measurements between satellites.

It is the merit of the inventors to have recognised that the transmitter part of the term $\Delta \Theta$ can be estimated in a consistent manner for all satellites. This estimation is carried out using a network of reference receivers (or reference stations). The transmitter part $\Theta_{eme}$ of $\Delta \Theta$ can be communicated to other receivers outside the network as assistance information. Thanks to this, a receiver that is external to the network can break down the term $\Delta \Theta$ into its transmitter part $\Theta_{eme}$ and its receiver part $\Theta_{rec}$, common to all channels, thereby reducing drastically the number of unknowns in the system of positioning equations. As the transmitter part $\Theta_{eme}$ of $\Delta \Theta$ is determined consistently for all satellites, the solution of the system of positioning equations highlights the integer ambiguities of the phase measurements $N_1$ for the different channels (i.e. for the different satellites).

Figure 2:
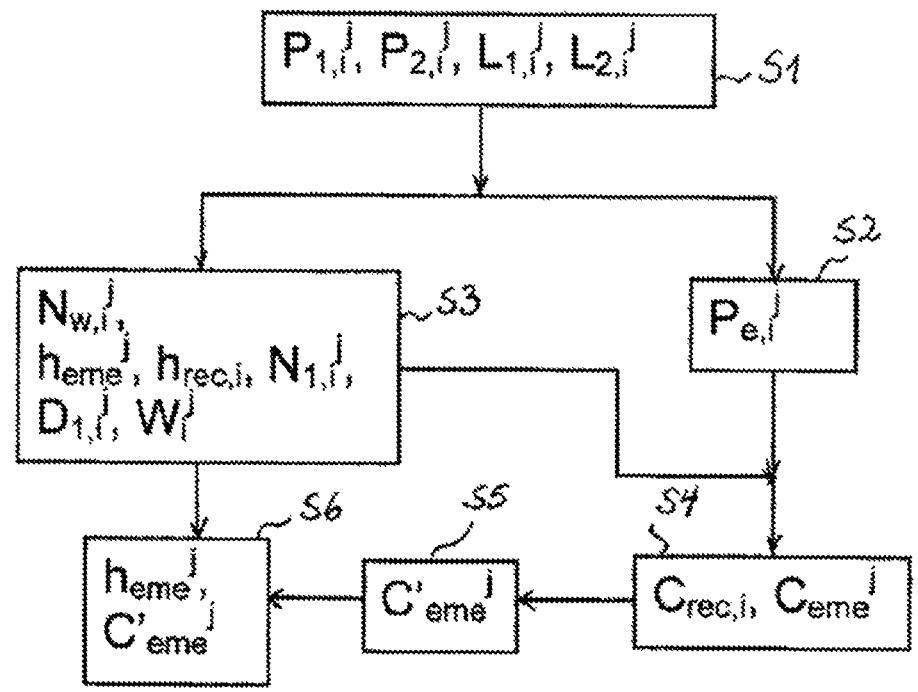
FIG. 2: a flowchart of a method for determining the assistance data.

We will now describe the method that determines the assistance data provided through a network of reference receivers, part of which is schematically shown in FIG. 1. A flowchart of this method is shown in FIG. 2. The reference receivers 10, 12, 14 each perform (non-ambiguous) code measurements and (ambiguous) phase measurements on the radio-navigation signals transmitted by the radio-navigation satellites 16, 18, 20. Each satellite transmits radio-navigation signals 22, 24 on at least the frequencies $f_1$ and $f_2$. (For reasons of clarity, FIG. 1 does not show all the possible satellite-receiver links.) At each time step ($t_k$), one therefore obtains, for the entire network, a set of code measurements $P_{1,i}{}^j(t_k)$, $P_{2,i}{}^j(t_k)$, $L_{1,i}{}^j(t_k)$ and $L_{2,i}{}^j(t_k)$, where the superscript (j) indicates the satellite, whose signals were received and the subscript (i) indicates the receiver that provided the measurement (step S1 in FIG. 2). As the satellites orbit the Earth, only some of them are visible at a given time from the location of each reference receiver. The dependence of the time, the index of the receiver and the satellite index will not be listed explicitly, unless it is necessary for proper comprehension.

It is necessary to define the second term on the right side of equation (E2) as the "iono-free" code clock difference, denoted by $\Delta h_p = h_{p,rec} - h_{p,eme}$. Similarly, we define an "iono-free" phase clock difference, denoted by $\Delta h = h_{rec} - h_{eme}$. The system of equations (E1) thus becomes:

$$P_1 = D_1 + e + \Delta h_p + \Delta \tau_p$$

$$P_2 = D_2 + \gamma e + \gamma \Delta h_p + \Delta \tau_p$$

$$\lambda_1 L_1 = D_1 + \lambda_1 W - e + \Delta h + \Delta \tau - \lambda_1 N_1$$

$$\lambda_2 L_2 = D_2 + \lambda_2 W - \gamma e + \Delta h + \gamma \Delta \tau - \lambda_2 N_2, \quad (E5)$$

where
- $\Delta \tau = \tau_{rec} - \tau_{eme}$ is the differential of the clock bias between the receiver and the transmitter between the "iono-free" phase clock and the phase clock for the frequency $f_1$—by construction, the amount corresponding to the frequency $f_2$ is $\gamma \Delta \tau$;
- $\Delta \tau = \tau_{p,rec} - \tau_{p,eme}$ is the differential of the clock biases between the receiver and the transmitter between the "iono-free" code clock and the code clock for the frequency $f_1$—by construction, the amount corresponding to the frequency $f_2$ is $\gamma \Delta \tau_p$ With this new notation, we can express the carrier code shift combination as follows:

$$P_e = D_1 + \frac{\lambda_1 W}{2} + \Delta h + \frac{\Delta h_p - \Delta h + \Delta \tau_p + \Delta \tau}{2} - \frac{\lambda_1 N_1}{2} \quad (E6)$$

Note that the value of this combination (left side of equation (E6)) is calculated directly with the code and phase measurements (step S2 in FIG. 2), whereas the values of the modelled parameters (right side of equation (E6)) are unknown at the outset. It is recognised that:

$$\Delta \Theta = \Delta h + \frac{\Delta h_p - \Delta h + \Delta \tau_p + \Delta \tau}{2} \quad (E7)$$

To calculate the values of $\Theta_{eme}$ for the different satellites, one determines, in a first step, the values $h_{eme}$ in a consistent manner for the network of receivers. This method (step S3 in FIG. 2) is described in the patent application FR 2 914 430 and in the article "Integer Ambiguity Resolution on Undifferenced GPS Phase Measurements and Its Application to PPP" by D. Laurichesse and F. Mercier in "Proceedings of ION GNSS 2007", Forth Worth, Tex., September 25-28, pp. 839-848.

The (non-ambiguous) phase differences between the emission of the signals by the satellite and the reception by the receiver can be written $L_1 + N_1$ and $L_2 + N_2$, where $N_1$ and $N_2$ represent the (integer) ambiguities. We set $N_w = N_2 - N_1$, $N_w$ being called the (integer) widelane ambiguity.

One calculates the ionospheric code delay by:

$$eP = \frac{P_1 - P_2}{1 - \gamma}. \quad (E8)$$

We set:

$$\tilde{N}_1 = \frac{P_1 - 2eP}{\lambda_1} - L_1 \text{ and } \tilde{N}_2 = \frac{P_2 - 2\gamma eP}{\lambda_2} - L_2. \quad (E9)$$

These quantities depend only on the measurements.

However, the code measurement noises are such that, at the scale of one pass (time of visibility of a satellite), the estimated $\tilde{N}_1$ and $\tilde{N}_2$ suffer from a noise of the order of tens of cycles. We use the code measurements to determine the widelane ambiguity.

We introduce the gross value $\tilde{N}_w$ (which is an estimated value) of the widelane ambiguity by:

$$\tilde{N}_w = \tilde{N}_2 - \tilde{N}_1 \quad (E10)$$

Substituting (E5) in (E9) we find for $N_w$ an expression of the form:

$$\tilde{N}_w = N_w + d + \mu_{rec} - \mu_{eme}. \quad (E11)$$

where $\mu_{rec}$ is a linear combination of $\tau_{rec}$, $\tau_{p,rec}$, $h_{rec} - h_{p,rec}$, $\mu_{eme}$ is a linear combination of $\tau_{eme}$, $\tau_{p,eme}$, $h_{eme} - h_{p,eme}$ and d is proportional to the difference between $D_1$ and $D_2$. The value of d being generally less than 0.1 widelane cycles, this quantity can be neglected in what follows. By calculating the average over one pass, we have:

$$\langle \tilde{N}_w \rangle = N_w + \langle \mu_{rec} \rangle - \langle \mu_{eme} \rangle \quad (E12)$$

On the scale of one pass, $\tilde{N}_w$ presents a sufficiently low noise (less than the fraction of cycle) to make a correct estimate of $N_w$ and thus of $\mu_{rec}$ and $\mu_{eme}$ (the widelane bias $\mu_{rec}$ and $\mu_{eme}$ remain constant over long periods).

In the absence of additional hypotheses, this mixed integer-real problem is singular: it is possible to shift $N_w$ by one integer if we change the difference $\mu_{rec} - \mu_{eme}$ at the same time. Moreover, $\mu_{rec}$ and $\mu_{eme}$ are defined only to within one real constant.

The calculation process is started by choosing a first network station, preferably one where it is known that the $\mu_{rec}$ are stable over time. For this station, the value of $\mu_{rec}$ is fixed arbitrarily, for example by setting $\mu_{rec} = 0$. One then goes through the passes of the satellites that are visible from this station. For each pass, one has $\langle \tilde{N}_w \rangle = N_w - \mu_{eme}$, by definition from the first station (with $\mu_{rec} = 0$). One therefore breaks down $\langle \tilde{N}_w \rangle$ into an arbitrary integral quantity (e.g. the nearest integer number), denoted by $N_w$, and a quantity that is not necessarily an integer and that corresponds to the difference $N_w - \langle \tilde{N}_w \rangle$, denoted by $\mu_{eme}$. This provides the $\mu_{eme}$ of the satellites that are visible from the first station.

For the set of satellites for which one now knows the internal delays $\mu_{eme}$, one estimates the delays $\mu_{rec}$ of the other stations. This time, in the equation $\langle \tilde{N}_w \rangle = N_w + \mu_{rec} -$ $\mu_{eme}$, the value of $\mu_{eme}$ is known. $\langle \tilde{N}_w \rangle + \mu_{eme}$ is then broken down into an arbitrary integer $N_w$ (of the new station) and the corresponding station delay $\mu_{rec}$. These steps are repeated for all satellites and all stations in the reference network. One thus obtains consistent values of $\mu_{rec}$ across the entire reference network. The values $\mu_{eme}$ can be considered constant over at least one day.

After the widelane ambiguity has been determined, the ambiguity $N_1$ remains unknown.

Because the widelane ambiguity is known, solving the ambiguity of phase $N_1$ or $N_2$ (narrowlane ambiguity) is significantly easier, especially with regard to the precision of the required modelling.

The code measurements $P_1$ and $P_2$ depend on several factors including the geometric distance between the points of transmission and reception, the ionospheric effects, the tropospheric effects, and the transmitter and receiver clocks. To identify the remaining ambiguities, one needs to have a sufficiently accurate model of these quantities, which will require a comprehensive resolution for the network of receivers to be treated, because of the clocks.

We set:

$$\hat{Q}_c = \frac{\gamma \lambda_1 (L_1 + \hat{N}_1) - \lambda_2 (L_2 + \hat{N}_1 + N_w)}{\gamma - 1} \quad \text{(E13)}$$

where $\hat{N}_1$ is an integer estimation of $N_1$, for example the nearest integer to $\langle \tilde{N}_w \rangle$. $\hat{N}_1$ can be removed from the true value of $N_1$ by ten or so cycles because of code measurement noise.

$\hat{Q}_c$ represents therefore an estimate of the non-ambiguous iono-free phase combination $Q_c$ (which is not directly measurable):

$$Q_c = \frac{\gamma \lambda_1 (L_1 + N_1) - \lambda_2 (L_2 + N_1 + N_w)}{\gamma - 1} \quad \text{(E14)}$$

By setting $\delta N_1 = N_1 - \hat{N}_1$, one obtains the system:

$P_c = D + \Delta h_p$ $Q_c = D_w + \Delta h + \lambda_c \delta N_1$, (E15)

where $\lambda_c = (\gamma \lambda_1 - \lambda_2)/(\gamma - 1)$, $D = (\gamma D_1 - D_2)/(\lambda - 1)$ geometric distance between the phase centres, ionospheric contribution offset), and $D_w = \lambda_c D$ Instead of directly calculating $N_1$, one first determines $\delta N_1$. Doing this requires an accurate modelling of $D_w$, which in particular uses the following elements:

- combination of the dual-frequency phase centres: this is the iono-free combination of the receiver and transmitter antenna phase centres (L1 and L2);
- the precise orbits of the satellites;
- law of satellite attitude (law of nominal yaw attitude);
- relativistic effects due to the eccentricity of the satellites;
- accurate modelling of the receiver position (with model of Earth tides);
- modelling of the tropospheric extension (a vertical lengthening per station with the lowering function depending on the site as defined in STANAG);
- modelling of Wind-up (geometric rotation of phase).

The parameters estimated by the filter are:
- at each time step, the clocks $h_{eme}$ and $h_{rec}$ of the satellites and stations,
- for each pass, a constant phase ambiguity $\delta N_1$ (without the constraint that this is an integer)
- a vertical tropospheric extension for each station, with a slow variation over time (typically a constant segment every 4 hours);
- precise satellite orbits (if precise orbits are not provided as input data).

The filter can be in as least squares formulation or in Kalman formulation, which is more compatible with real-time processing. The input values used by the filter are the iono-free code and iono-free phase values, with their respective noise, which are the order of 1 m for the code and 1 cm for the phase.

After this step, one obtains estimates of the identified residues $\delta N_1$ calculated by $(\hat{Q}_c - D_w - \Delta h)/\lambda_c$. Examples of residues $\delta N_1$ are shown in FIG. 1. (The $\delta N_1$ are not integers because no assumption about integers was made during the filtering.)

This filtering step is used primarily to calculate correctly the term $D_w$ (geometric modelling). The clocks identified at this stage are subsequently used as initial values, thereby allowing the small clock variations to be worked on subsequently, but this is not essential.

With the value of $D_w$ obtained by filtering, one now looks for the integer values of $\delta N_1$ at the level of the reference network. Once again, one uses the equation $\hat{Q}_c - D_w = \lambda_c \delta N_1 + h_{rec} - h_{eme}$, (E16)

where $D_w$ now takes the value found by the filtering. Note that the equation has a global unobservability. Indeed, one can shift the values $\delta N_1$ for a given transmitter and the corresponding values $h_{eme}$ and/or $h_{rec}$ while keeping the equation valid:

$\hat{Q}_c - D_w = \lambda_c (\delta N_1 + \alpha) + (h_{rec} - \lambda_c \alpha) - h_{eme}$ (E17)

At this stage, one iteratively calculates the values $h_{eme}$ starting with a first station (a first reference receiver), whose clock is taken as the reference clock, and successively adding stations in order to complete the entire network.

For the first station, one chooses $\delta N_1 = 0$ and $h_{rec} = 0$. This choice is arbitrary and results in a set of $h_{eme}$ for the satellites that are visible from the first station, such that equation (E16) holds.

The addition of a station is carried out as follows. With the set of $h_{eme}$ known before the addition of the station we calculate the residues $\delta N_1 + h_{rec}/\lambda_c$ which must be expressed as an integer value per pass (the $\delta N_1$), and a real value for each time step (corresponding to the clock $h_{rec}$ of the added station). FIG. 2 shows the residues $\delta N_1 + h_{rec}/\lambda_c$ for a newly added station. Note that the residues are spaced by integer values and their offset from the nearest integer value is the same. We can therefore suppose that the offset between the residue and the nearest integer value corresponds to $h_{rec}/\lambda_c$ and the integer value itself to $\delta N_1$.

Note that for a new station, the satellite clocks, and thus the residues $\delta N_1 + h_{rec}/\lambda_c$ are only known, a priori, for a part of the passes. But as $\delta N_1$ is constant per pass (cycle breaks are included in $\hat{Q}_c - D_w$), it can be extended to the entire pass. The times at which a given satellite is visible from a station correspond only partially to the times at which the satellite is visible from a neighbouring station. The greater the distance between stations, the shorter the length of common observation time. This implies that one always adds a station neighbouring with at least one of the previous stations.

Note that together with the set of integer $\delta N_1$, one also obtains a set of consistent satellite clocks $h_{eme}$ and receivers $h_{rec}$, having the first station's clock as its reference clock.

Using the values $\{\mu_{eme}^j\}$ (valid for at least one day) and $\{h_{eme}^j\}$ (needing to be updated each epoch), a dual-frequency receiver outside the network can determine the ambiguities $N_1$ for the satellites in view in an efficient manner.

On the other hand, to find the quantity $\Theta_{eme}$, one must also know the transmitter part of the second term on the right side of the equation (E7), that is $(h_{p,eme}-h_{eme}+\tau_{p,eme}\tau_{eme})/2$, which will be denoted $C_{eme}$ hereafter. We furthermore define:

$$C_{rec}=(h_{p,rec}-h_{rec}+\tau_{p,rec}\tau_{rec})/2 \text{ and } \Delta C=C_{rec}-C_{eme}.$$

In the network of reference receivers, the values of $\mu_{rec}$, $N_w$, $N_1$, $h_{rec}$ and $h_{eme}$ are known thanks to the preceding calculations. The quantity $\Delta C$ is thus observable:

$$\Delta C = \frac{P_1 + \lambda_1 L_1}{2} - D_1 - \frac{\lambda_1 W}{2} - \Delta h + \frac{\lambda_1 N_1}{2} = C_{rec} - C_{eme} \quad (E18)$$

Note that $\Delta C$ corresponds to the measurement residue obtained by subtracting from the carrier code shift combination (i.e. from the term $(P_1+\lambda_1 L_1)/2$), the (modelled) geometric contribution which includes the distance and the windup effect (i.e. the term $D_1+\lambda_1 W/2$), the contribution of the receiver and transmitter iono-free phase clock values (i.e. the term $\Delta h$) and the contribution of the ambiguity of the phase measurement (i.e. the term $-\lambda_1 N_1/2$). One can calculate the receiver and transmitter parts $C_{rec}$ and $C_{eme}$ of the measurement residue for example by the method of least squares at each time step (step S4 in FIG. 2). Taking into account all receivers in the network, we have a system of equations of the form:

$$\{\Delta C_i^j = C_{rec,i} - C_{eme}^j\}_{i,j}, \quad (E19)$$

which can be written $\vec{\Delta C} = \Gamma \vec{x}$, where $\Gamma$ is the matrix of partial derivatives and $\vec{x}$ is the vector of the unknowns: $\vec{x}=(C_{rec,1}, \ldots C_{rec,i}, C_{eme}^1, \ldots, C_{eme}^J)^T$ with i=number of receivers in the network and J=number of satellites.

Note once again that the $C_{eme}$ depend only on the satellites whereas the $C_{rec}$ depend only on the receivers. Since the system (E19) includes one equation less than unknowns, we need to add a constraint equation, which fixes for example the sum or average of the $C_{eme}$ to 0:

$$\Sigma_j C_{eme}^j = 0 \quad (E20)$$

Figure 4:
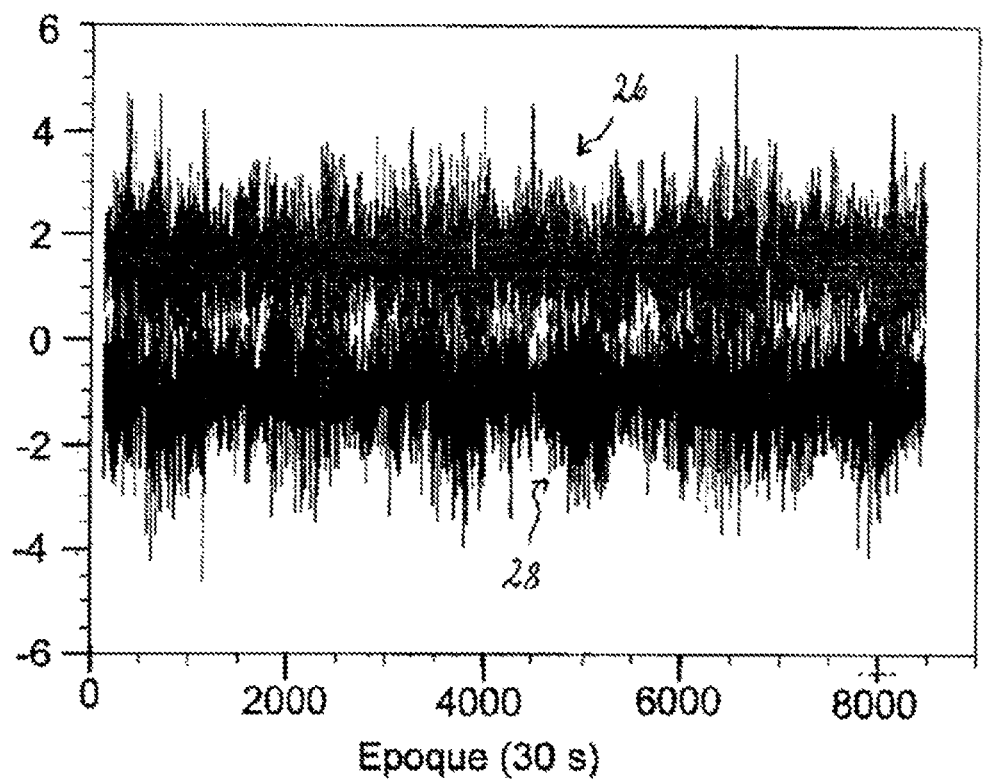
FIG. 4: a graphical representation of the transmitter parts of two measurement residues each obtained by subtracting from a carrier code shift measurement the (modelled) geometric contribution, the contribution of the iono-free receiver and transmitter phase clock values and the contribution of the ambiguity of the phase measurement.
Figure 5:
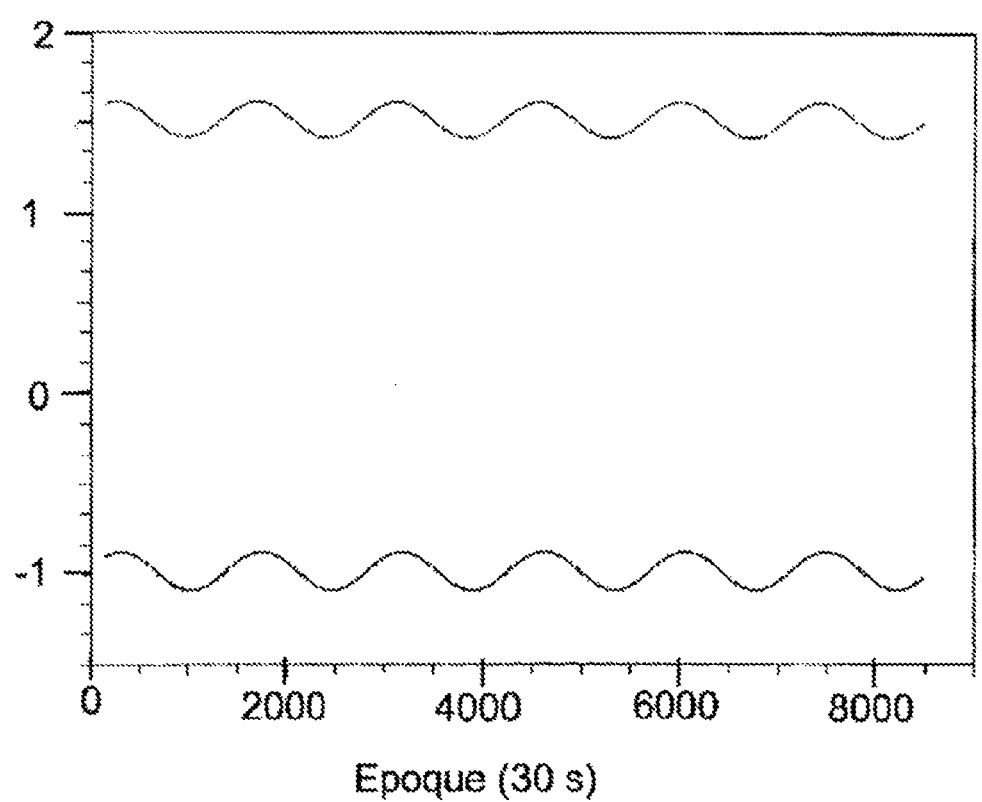
FIG. 5: a graphical representation of the transmitter parts of two measurement residues of FIG. 4 after smoothing.

The values $C_{eme}$ that we find are very noisy because of the code noise on the measurements. Two examples of plots 26, 28 of $C_{eme}$ are shown in FIG. 4. Preference is given to smoothing the values $C_{eme}$ by a model (step S5 in FIG. 2). It was found that it is preferable to use a sine function with a period of 12 hours to adjust it to each $C_{eme}$. Thus one finds the smoothed values $C'_{eme}^j(t)$. FIG. 5 shows the plots of FIG. 4 after smoothing with the sine functions.

As assistance data, one finally has (step S6 in FIG. 2) iono-free transmitter clock values $h_{eme}$ (a value by time step and not by satellite) and the values $C'_{eme}$ (identified by the parameters of the sine functions) that can be transmitted to a receiver outside the network and used by it to fix the ambiguities $N_1$.

Figure 3:
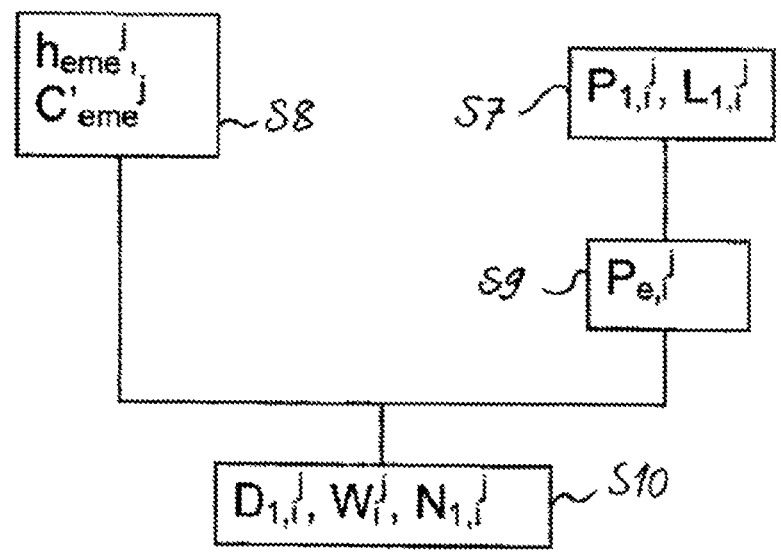
FIG. 3: a flowchart of a geopositioning method using the assistance data that can be determined in the method of FIG. 2.

A method for geopositioning in a receiver outside the reference network, which provides the values $h_{eme}$ and $C'_{eme}$ is shown schematically in FIG. 3. The receiver performs code and phase measurements for satellites visible from its geographical location (step S7 in FIG. 3). In addition, it receives the values $h_{eme}$ and $C'_{eme}$ (step S8 in FIG. 3). With the code and phase measurements on the frequency $f_1$, the receiver can derive the carrier code shift observable (step S9 in FIG. 3). Furthermore, by using the assistance data, the receiver can then calculate the quantities:

$$\frac{P_1^j + \lambda_1 L_1^j}{2} + h_{eme}^j + C'_{eme}^j = D_1^j + \frac{\lambda_1 W^j}{2} - \frac{\lambda_1 N_1^j}{2} + h_{rec} + C_{rec} \quad (E21)$$

In system (E21), the satellite indices were used to illustrate more clearly what terms are common to all the satellites (all the channels of the receiver). Note that the term $h_{rec}+C_{rec}$ is common to all the receiver channels and is equivalent to a global clock, to be estimated at each time step (i.e. for each measurement). The phase ambiguity $N_1$, which depends on the satellite, only takes a single value per pass (time of satellite visibility) if we assume that the observation is not interrupted during this time and that the phase jumps are detected and included in the phase measurement $L_1$. It is worth noting that it is sufficient for the receiver to know the values $h_{eme}+C'_{eme}$; the values $h_{eme}$ and $C'_{eme}$ do not therefore need to be transmitted separately. Note also that $h_{rec}+C_{rec}$ corresponds to $\Theta_{rec}$ as defined above; in the same way: $h_{eme}+C'_{eme}=\Theta_{eme}$.

If the receiver position and the corresponding tropospheric extension are known (i.e. if $D_1$ is known), the quantities $(P_1+\lambda_1 L_1)/2-\lambda_1 W/2-D_1 h_{eme}+C_{eme}$ aggregate around values separated by intervals equal to integer multiples of $\lambda_1/2$.

If one wishes to determine the position of the receiver ($D_1$ in this case being unknown at the start), we can, for example, solve a least squares problem over a certain period (e.g. a few hours) in which the following parameters are to be determined (step S10 in FIG. 3):

the position of the receiver (included in the modelling of $D_1$);

the vertical tropospheric extension (included in the modelling of $D_1$);

the clock receiver associated with the carrier code shift combination ($h_{rec}+C_{rec}$); and the phase ambiguities (one value per pass).

The ambiguities can then be determined by a "bootstrap" mechanism: an ambiguity is fixed to an arbitrary integer, after which the other ambiguities aggregate around integer values and can be determined iteratively.

Using the information $h_{eme}$ and $C'_{eme}$, the carrier code shift measurement becomes an unambiguous observable, free from the ionospheric contribution ("iono-free"), and having a noise equal to half the code noise. The PPP ("Precise Point Positioning") has an accuracy of 20 to 50 cm in purely stochastic positioning. Its accuracy increases rapidly if one performs a static positioning of the receiver by storing several minutes' worth of measurements. For example, one obtains a positioning accuracy of about 10 cm for a quarter of an hour of measurements and about 2 cm for half an hour of data (with a receiver that is not too affected by multipath). The boot time is around an hour.

The invention claimed is:

1. A method for performing geopositioning, by at least one radio navigation signal receiver of a reference network, using radio-navigation signals from a set of satellites of the reference network, each satellite of the set broadcasting at least a first radio-navigation signal on a first frequency and a second navigation signal on a second frequency distinct from the first frequency, the method of performing the geopositioning enabling the at least one radio navigation signal receiver to remove phase ambiguities, the method comprising:

receiving, by the at least one radio navigation signal receiver, for each satellite of the set that is visible from the said receiver, at least the said first radio-navigation signal;

performing, by the at least one radio navigation signal receiver, for each visible satellite, code measurements and phase measurements of the first radio-navigation signal received, said phase measurements presenting the phase ambiguities, the phase ambiguities including an ambiguity of an a priori unknown integer number of cycles;

receiving, by the at least one radio navigation signal receiver, a set of assistance data, wherein the set of assistance data comprises, for each satellite of the set of satellites, data sufficient for reconstructing a transmitter clock value associated with a carrier code shift combination, derived in a same manner across all the satellites and receivers of the reference network;

determining, by the at least one radio navigation signal receiver, for each satellite, a carrier code shift combination value from the code measurement and the phase measurement of the first radio-navigation signal, the phase ambiguities being removed as a result of the determining of the carrier code shift combination value;

determining, by the at least one radio navigation signal receiver, from said carrier code shift combination value the transmitter clock value associated with the carrier code shift combination, to obtain an unambiguous carrier code shift observable;

utilizing, by the at least one radio navigation signal receiver, the unambiguous carrier code shift observables to determine a precise position of the at least one radio navigation signal receiver.

2. The method according to claim 1, wherein the data sufficient for reconstructing the transmitter clock value associated with the carrier code shift combination comprise a satellite clock value associated with the carrier code shift combination.

3. The method according to claim 1, wherein the data sufficient for reconstructing the transmitter clock value associated with the carrier code combination shift value comprise iono-free transmitter phase clock values associated with a resolution of the ambiguities as well as smoothed transmitter parts of measurement residues obtained by:

receiving the code measurements and the phase measurements from the said radio-navigation signals recorded by the receivers in the reference network, said phase measurements having each an ambiguity that is an a priori unknown integer number of cycles;

resolving the ambiguities in the phase measurements on the first frequency in a same manner across all the satellites and reference receivers;

deducing a set of iono-free transmitter phase clock values arising from the resolution of said ambiguities and a set of iono-free receiver phase clock values arising from the resolution of said ambiguities;

calculating, for each satellite-reference receiver pair, a carrier code shift combination value from the code measurement and the phase measurement performed by the respective reference receiver for the respective satellite on the first frequency, and subtracting from this value a geometric contribution, a contribution of the iono-free receiver phase clock value and an iono-free transmitter phase clock value as well as a contribution of the resolved ambiguity of the phase measurement, so as to obtain a measurement residue;

separating, in a same manner across all the satellites and receivers of the network, each of the obtained measurement residues into a transmitter part and a receiver part; and smoothing the transmitter part of the said measurement residues.

4. The method according to claim 3, comprising, for each satellite of said set of satellites, the action of calculating a transmitter clock value associated with the carrier code shift combination as the sum of the iono-free transmitter clock value and the smoothed measurement residue.

5. The method according to claim 3, wherein the smoothing of the transmission parts of the said measurement residues is performed each time by fitting a sine function with a period of 12 hours.

6. The method according to claim 1, wherein the first frequency is selected from a list comprising 1575.42 MHz, 1227.6 MHz, 1176.45 MHz, 1207.14 MHz, 1278.75 MHz, 1561.098 MHz, 1589.742 MHz, 1207.14 MHz, and 1268.52 MHz.

7. The method according to claim 1, wherein an accuracy of said precise position being on a range of 20 to 50 centimeters.

8. The method according to claim 7, further comprising:
increasing the accuracy of said precise position by storing a plurality of precise positions accumulated over a time period.

9. The method according to claim 8, wherein the accuracy of said precise position is increased to 10 centimeters.

10. The method according to claim 9, wherein the time period is a quarter of an hour.

11. The method according to claim 8, wherein the accuracy of said precise position is increased to 2 centimeters.

12. The method according to claim 11, wherein the time period is a half an hour.

13. The method according to claim 1, wherein the code measurements include code measurement noises, at a scale of one pass, of an order of tens of cycles.

14. The method according to claim 1, wherein, with respect to the phase ambiguities being removed during the determining of the carrier code shift combination value, the code measurements are utilized to determine a widelane ambiguity.

15. The method according to claim 14, wherein, with respect to the phase ambiguities being removed during the determining of the carrier code shift combination value, the widelane ambiguity is utilized to solve the narrowlane ambiguity.

16. A computer program product comprising non-transitory computer readable medium containing a computer program code for implementing geopositioning operations, by at least one radio navigation signal receiver of a reference network, using radio-navigation signals from a set of satellites of the reference network, each satellite of the set broadcasting at least a first radio-navigation signal on a first frequency and a second navigation signal on a second frequency distinct from the first frequency, the computer program code for implementing the geopositioning operations enabling the at least one radio navigation signal receiver to remove phase ambiguities, the computer program code executable by a processing unit to cause the processing unit to perform:

receiving, by the at least one radio navigation signal receiver, for each satellite of the set that is visible from a receiver, at least the said first radio-navigation signal;

performing, by the at least one radio navigation signal receiver, for each visible satellite, code measurements and phase measurements of the first radio-navigation signal received, said phase measurements presenting the phase ambiguities, the phase ambiguities including an ambiguity of an a priori unknown integer number of cycles;

receiving, by the at least one radio navigation signal receiver, a set of assistance data, wherein the set of assistance data comprises, for each satellite of the set of satellites, data sufficient for reconstructing a transmitter clock value associated with a carrier code shift combination, derived in a same manner across all the satellites and receivers of the reference network;

determining, by the at least one radio navigation signal receiver, for each satellite, a carrier code shift combination value from the code measurement and the phase measurement of the first radio-navigation signal, the phase ambiguities being removed as a result of the determining of the carrier code shift combination value;

determining, by the at least one radio navigation signal receiver, from said carrier code shift combination value the transmitter clock value associated with the carrier code shift combination, to obtain an unambiguous carrier code shift observable; and utilizing, by the at least one radio navigation signal receiver, the unambiguous carrier code shift observables to determine a precise receiver position of the at least one radio navigation signal receiver.

17. A global navigation satellite system receiver configured to implement geopositioning operations using radio-navigation signals from a set of satellites of a reference network, each satellite of the set broadcasting at least a first radio-navigation signal on a first frequency and a second navigation signal on a second frequency distinct from the first frequency, the geopositioning operations enabling the global navigation satellite system receiver to remove phase ambiguities, the operations comprising:

receiving, by the global navigation satellite system receiver, for each satellite of the set that is visible from the global navigation satellite system receiver, at least the said first radio-navigation signal;

performing, by the global navigation satellite system receiver, for each visible satellite, the code measurements and the phase measurements of the first radio-navigation signal received, said phase measurements presenting the phase ambiguities, the phase ambiguities including an ambiguity of an a priori unknown integer number of cycles;

receiving, by the global navigation satellite system receiver, a set of assistance data, wherein the set of assistance data comprises, for each satellite of the set of satellites, data sufficient for reconstructing a transmitter clock value associated with a carrier code shift combination, derived in a same manner across for all the satellites and receivers of the reference network;

determining, by the global navigation satellite system receiver, for each satellite, a carrier code shift combination value from the code measurement and the phase measurement of the first radio-navigation signal, the phase ambiguities being removed as a result of the determining of the carrier code shift combination value;

determining, by the at least one radio navigation signal receiver, from said carrier code shift combination value the transmitter clock value associated with the carrier code shift combination, to obtain an unambiguous carrier code shift observable; and utilizing, by the global navigation satellite system receiver, the unambiguous carrier code shift observables to determine a precise global navigation satellite system receiver position.

* * * * *